(12) United States Patent
Basso et al.

(10) Patent No.: US 6,937,606 B2
(45) Date of Patent: Aug. 30, 2005

(54) DATA STRUCTURES FOR EFFICIENT PROCESSING OF IP FRAGMENTATION AND REASSEMBLY

(75) Inventors: Claude Basso, Raleigh, NC (US); Jean Louis Calvignac, Cary, NC (US); Marco C. Heddes, Cary, NC (US); Joseph Franklin Logan, Raleigh, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 09/839,010

(22) Filed: Apr. 20, 2001

(65) Prior Publication Data

US 2002/0156908 A1 Oct. 24, 2002

(51) Int. Cl.[7] .............................................. H04L 12/56
(52) U.S. Cl. ...................................... 370/412; 370/474
(58) Field of Search ................................. 370/412, 413, 370/473, 474, 521

(56) References Cited

U.S. PATENT DOCUMENTS

| | | | | |
|---|---|---|---|---|
| 4,922,487 A | | 5/1990 | Eilenberger et al. ........... | 370/60 |
| 5,561,807 A | * | 10/1996 | Verplanken et al. ......... | 719/314 |
| 5,974,518 A | | 10/1999 | Nogradi ....................... | 711/173 |
| 5,987,034 A | | 11/1999 | Simon et al. ................. | 370/465 |
| 6,208,650 B1 | * | 3/2001 | Hassell et al. ............... | 370/392 |
| 6,724,767 B1 | * | 4/2004 | Chong et al. ................ | 370/412 |
| 6,781,992 B1 | * | 8/2004 | Rana et al. ................... | 370/394 |
| 6,836,480 B2 | * | 12/2004 | Basso et al. .................. | 370/390 |
| 2002/0118694 A1 | * | 8/2002 | Calvignac et al. ........... | 370/428 |
| 2002/0154634 A1 | * | 10/2002 | Basso et al. ................. | 370/390 |

FOREIGN PATENT DOCUMENTS

| | | | |
|---|---|---|---|
| DE | 4130318 | 3/1993 | ........... H04L/12/56 |
| JP | 40292039 | 10/1992 | ........... H04L/12/56 |
| WO | 9809410 | 3/1998 | ........... H04L/12/56 |

OTHER PUBLICATIONS

U.S. patent application, "Data Structures for Efficient Processing of Multicast Transmissions" filed Apr. 20, 2001, ser. No. unassigned.

* cited by examiner

Primary Examiner—Frank Duong
Assistant Examiner—Michael J. Moore
(74) Attorney, Agent, or Firm—Andrew M. Calderon (57) ABSTRACT

Data structures, a method, and an associated transmission system for IP fragmentation and IP reassembly on network processors in order to minimize memory allocation requirements. Frame data for IP fragmentation or reassembly on a network processor is read into buffers to which are associated various control structures. The control structures permit IP fragmentation or reassembly to be accomplished without creating multiple copies of the frame or fragments.

12 Claims, 7 Drawing Sheets

| Word | Bits | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | Message ID | | | | | | | | Message Parameters | | | | | | | | | | | | | | | | | | | | | | | |
| 1 | Data | | | | | | | | | | | | | | | | | | | | | | | | | | | | | | | |
| ... | ... | | | | | | | | | | | | | | | | | | | | | | | | | | | | | | | |
| N-1 | Data | | | | | | | | | | | | | | | | | | | | | | | | | | | | | | | |

DATA STRUCTURES FOR EFFICIENT PROCESSING OF IP FRAGMENTATION AND REASSEMBLY

CROSS-REFERENCE TO RELATED APPLICATION

The invention disclosed in this application is related in subject matter to co-pending U.S. patent application Ser. No. 09/839,079 (RAL9-2000-0120US) filed concurrently herewith by J. F. Logan et al. for "Data Structures for Efficient Processing of Multicast Transmissions" and assigned to a common assignee with this application. The disclosure of application Ser. No. 09/839,079 is incorporated herein by reference.

DESCRIPTION

BACKGROUND OF THE INVENTION

1. Field of the Invention

The present invention generally relates to communications on a network by a network processor and, more particularly, to a method of performing Internet Protocol (IP) fragmentation and reassembly in a network processor in a more efficient manner than current designs accomplish this process.

2. Background Description

In telecommunications scenarios it is sometimes necessary to break a data frame into smaller pieces prior to transmission. This is typically done in cases where a frame may be too large for a physical link (i.e., Ethernet Max transfer unit=1.5 k bytes, token ring=17 k bytes). For such a scenario, the frame must be divided into smaller frame segments in order to satisfy link requirements. In particular, Internet Protocol (IP) fragmentation involves splitting an IP frame into smaller pieces. A typical solution in a network processor involves copying the data to create the body of each fragment, creating a new header for the fragment, and updating the buffer linked list. This is done for each IP fragment to be generated. Copying the data comprising the body of each fragment can impose a significant burden on memory allocation requirements. High performance network processors generally cannot afford to allocate the additional memory bandwidth required in this approach.

In a high performance network processor, one must develop a novel solution in order to minimize memory requirements for IP fragmentation (and IP reassembly).

SUMMARY OF THE INVENTION

It is therefore an object of the present invention to provide data structures, a method, and an associated system for IP fragmentation and reassembly on network processors in order to minimize memory allocation requirements.

According to the invention, the new approach eliminates the need to copy the entire frame for each multicast instance (i.e., each multicast target), thereby both reducing memory requirements and solving problems due to port performance discrepancies. In addition, the invention provides a means of returning leased buffers to the free queue as they are used (independent of when other instances complete transmission) and uses a counter to determine when all instances are transmitted so that a reference frame can likewise be returned to the free queue.

According to the invention, the new approach eliminates the need to copy the entire frame, adjust byte counts, update the memory link list and update headers for each fragment by utilizing the frame/buffer linking structures within the network processor architecture. The invention requires only the leasing and chaining of buffers for fragment header information only.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
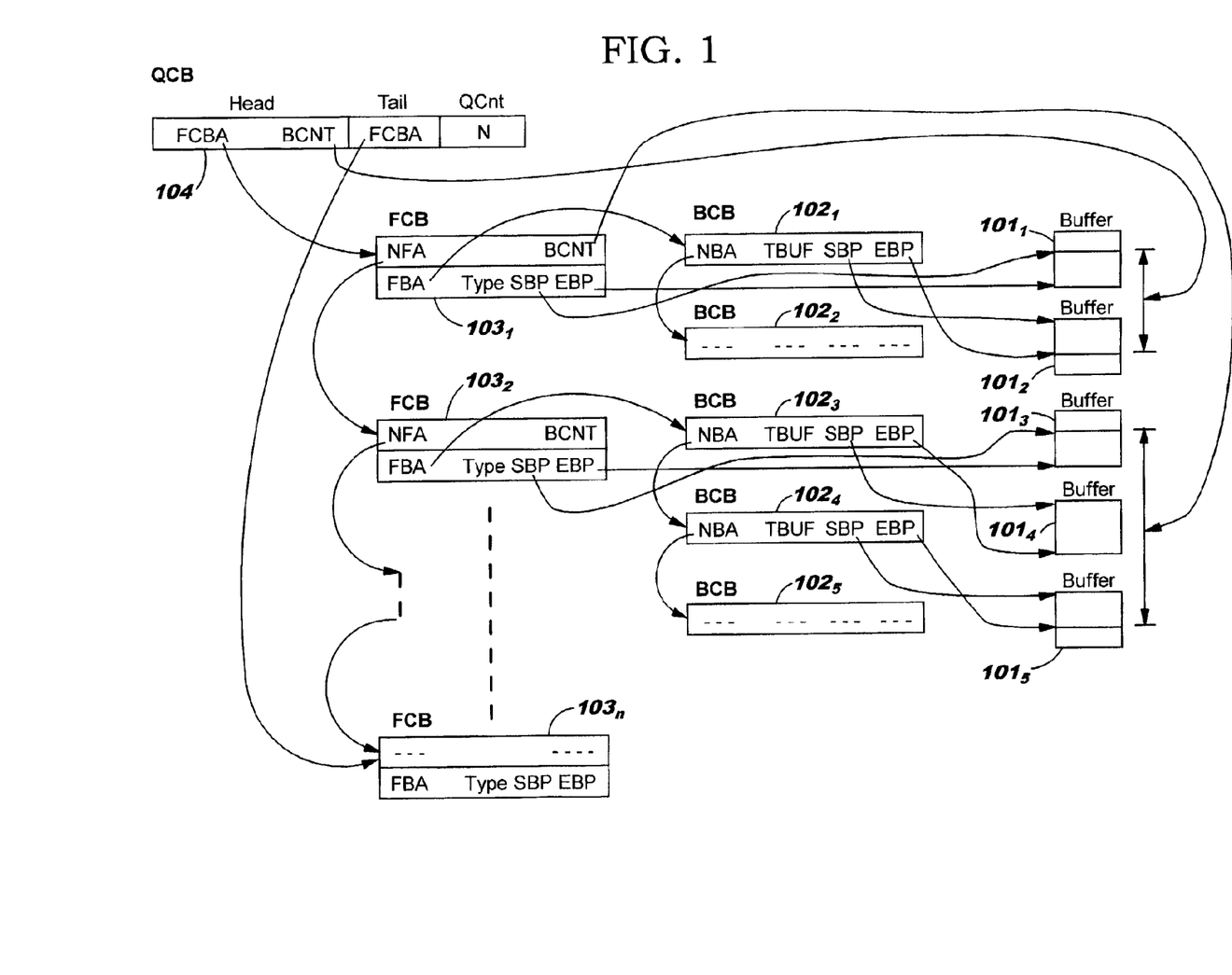
FIG. 1 is a block diagram illustrating the data structures.

Referring now to the drawings, and more particularly to FIG. 1, there is shown the data structures. A frame is stored in a series of buffers $101_1$ to $101_5$. Each buffer 101 has a corresponding Buffer Control Block (BCB) $102_1$ to $102_5$, which is used to link the series of buffers into a frame. Each frame has a corresponding Frame Control Block (FCB) $103_1$ to $103_n$, which is used to link a series of frames into a queue. Each queue has a Queue Control Block (QCB) 104, which maintains the address of the first and last FCB 103 in the queue, and a count of the number of frames in the queue.

Data Structure Definitions

Buffers 101 are used for storage of data. Each buffer 101 is 64-bytes in size and may store from 1 to 64-bytes of valid data. All valid data within a buffer 101 must be stored as a single contiguous range of bytes. Multiple buffers are chained together via a linked list to store frames larger than 64 bytes.

Initially, all buffers 101 are placed in the free buffer queue. When a frame arrives, buffers are popped from the head of the free buffer queue and used to store the frame data. When the final transmission of a frame is performed, the buffers used to store the frame data are pushed onto the tail of the free buffer queue.

A Buffer Control Block (BCB) 102 forms the linked list for chaining multiple buffers into a frame. It also records which bytes of the corresponding buffer 101 contain valid data. For every buffer 101 there is a corresponding BCB 102. The address of a buffer 101 in Datastore Memory (205 and 206 in FIG. 2) also serves as the address of the corresponding BCB 102 in the BCB Array. A BCB 102 contains the following fields:

The Next Buffer Address (NBA) field is used to store the pointer to the next buffer 101 in a frame. The NBA field in the BCB 102 for the current buffer 101 contains the address of the frame's next buffer 101 (and corresponding BCB 102).

The Starting Byte Position (SBP) field is used to store the offset of the first valid byte of data in the next buffer 101 of a frame. Valid values are from 0 to 63.

The Ending Byte Position (EBP) field is used to store the offset of the last valid byte of data in the next buffer 101 of a frame. Valid values are from 0 to 63.

The Transient Buffer (TBUF) bit is used only when transmitting multicast frames to specify whether the next buffer 101 in the frame should be returned to the free buffer queue after its data is read for transmission. This bit is valid only for multicast frames. It is set to a default state of zero upon frame reception. Note that IP fragmentation is handled as a multicast case.

Note that the SBP, EBP, and TBUF field apply to the "next" buffer 101 in the frame and not the buffer 101 corresponding to the current BCB 102. These fields are defined in this way to permit the SBP, EBP, and TBUF information for the next buffer 101 to be fetched concurrently with its address (NBA).

Each of the fields in a BCB 102 is initially loaded by the Dataflow hardware 202 (FIG. 2) during frame reception. Picocode may subsequently modify the fields in the BCB 102 to "edit" the frame prior to transmission. The NBA field may be modified to add or delete buffers in a frame. The SBP and EBP fields may be modified to change the number of valid bytes in a buffer 101. The TBUF bit may be set for buffers that are part of a multicast frame to request that the buffer 101 be returned to the free buffer queue immediately after its data is transmitted.

The NBA field of the BCB 102 is also used to form the linked list of buffers in the free buffer queue. The NBA is the only field in the BCB 102 that contains valid information when the corresponding buffer 101 is in the free buffer queue.

A Frame Control Block (FCB) 103 forms the linked list of frames in a queue. It also records the total number of valid bytes in the frame, the buffer address and SBP/EBP of the first buffer 101 in the frame, and a two bit frame "type" field. An FCB 103 includes the following fields:

The Next Frame Address (NFA) field is used to store the pointer to the next frame in a queue of frames. The NFA field in the FCB 103 for the current frame contains the address of the FCB 103 for the next frame in the queue. This field contains no valid data if the corresponding frame is the last frame in the queue. If the "QCNT" field in the QCB is zero, then no frames exist in the queue. If the "QCNT" field in the QCB is 1, then the "NFA" field in the FCB at the head of the queue is not valid as there is no "next frame" in the queue.

The Byte Count (BCNT) field is used to store a count of the total number of valid bytes in all buffers of the next frame in a queue of frames. Note that the BCNT applies to the "next" frame in the queue, and not the frame associated with the FCB 103 in which the BCNT field is stored. The BCNT field is defined in this way to permit the address (NFA) and length (BCNT) of the next frame in the queue to be fetched concurrently.

The First Buffer Address (FBA) field is used to store the address of the first buffer 101 (and corresponding BCB 102) in a frame.

The SBP and EBP fields are used to store the starting and ending byte positions of valid data in the first buffer 101 of a frame.

The Type field is used by picocode to instruct the Dataflow hardware 202 (FIG. 2) on the format and type of the frame to be transmitted.

00—Unicast frame with FACB—The frame is to be transmitted to a single destination (unicast), and each buffer 101 is to be returned to the free buffer queue as data is read for transmission. One or more Frame Alteration Control Blocks (FACBs) are stored in the first buffer 101 of the frame.

01—Static Frame with FACB—The frame is to be transmitted without returning any of the buffers to the free buffer queue. One or more Frame Alteration Control Blocks (FACBS) are stored in the first buffer 101 of the frame.

10—Unicast frame without FACB—The frame is to be transmitted to a single destination (unicast), and each buffer 101 is to be returned to the free buffer queue as data is read for transmission. No Frame Alteration Control Blocks (FACBs) are stored in the first buffer 101 of the frame.

11—Multicast frame with FACB and first buffer is TBUF—The frame is to be transmitted to multiple destinations (multicast), and the buffers that are common to all instances of the frame are to be returned to the free buffer queue only after the frame has been completely transmitted to all destinations. One or more Frame Alteration Control Blocks (FACBs) are stored in the first buffer 101 of each frame instance. Also, the first buffer 101 of the frame, and any subsequent buffer 101 with the TBUF bit set in the BCB 102, are assumed to be associated with a single frame instance and are returned to the free buffer queue immediately after data is transmitted from the buffer 101.

Each of the fields in an FCB 103 is initially loaded by the Dataflow hardware 202 (FIG. 2) during frame reception. Picocode may subsequently overlay the BCNT, FBA, SBP, EBP, and Type fields of the FCB 103 prior to frame transmission. The BCNT field may be modified if the length of the frame was changed as a result of editing. The FBA, SBP, and EBP fields may be modified if there is a change in the address or valid data range of the first buffer 101 of the frame. The Type field is written to set the type of frame transmission.

A free FCB queue is used to maintain a linked list of FCBs that are not currently allocated to a frame. The NFA field of the FCB 103 is used to form the linked list of FCBs in the free FCB queue. The NFA is the only field in the FCB 103 that contains valid information when the corresponding FCB 103 is in the free FCB queue.

A Queue Control Block (QCB) 104 maintains a queue of frames by storing the address of the first and last FCBs in the queue, and a count of the total number of frames in the queue. A QCB 104 contains the following fields:

Head FCBA—Used to store the FCB Address (FCBA) of the frame at the head of the queue.

Head BCNT—Used to store a count of the total number of valid bytes in the frame at the top of the queue.

Tail FCBA—Used to store the FCB Address (FCBA) of the frame at the tail of the queue.

QCNT—Used to store a count of the number of frames currently in the queue.

Frames are added to the tail of a queue as follows:

1. If one or more frames are already in the queue (QCNT greater than or equal to 1), the NFA and BCNT fields in the FCB 103 originally at the tail of the queue are written to chain to the new frame onto the tail of the queue. If no frames were previously in the queue (QCNT equal to 0), the Head FCBA and Head BCNT fields of the QCB 104 are written to establish the new frame as the head of the queue.

2. The Tail FCBA of the QCB 104 is written to point to the new FCB 103 added to the tail of the queue.

3. The QCNT of the QCB 104 is incremented by 1 to reflect one additional frame in the queue.

Frames are removed from the head of a queue as follows:
1. If more than one frame is already in the queue (QCNT greater than 1), the NFA and BCNT fields in the FCB 103 at the head of the queue are read to obtain the FCBA and BCNT for the new frame that will be at the head of the queue. These FCBA and BCNT values are then written to the Head FCBA and Head BCNT of the QCB 104 to establish the new frame at the head of the queue.
2. The QCNT of the QCB 104 is decremented by 1 to reflect one less frame in the queue.

Frame Reception

This section describes the use of the data structures from frame reception through dispatch to the network processor.

Step 1: As the first frame data is received, a free buffer address is popped from the head of the free buffer queue and a free FCB 103 is popped from the head of the free FCB queue. Up to 64-bytes of frame data are written to the buffer 101. The FCB 103 is written with the FBA, SBP, and EBP values for the first buffer 101. A working byte count register is set to the number of bytes written to the first buffer 101. If the entire frame fits in the first buffer 101, then go to step 3; otherwise, continue with step 2.

Step 2: An additional buffer 101 is popped from the free buffer queue and up to 64-bytes of data are written to the buffer 101. The BCB 102 for the previous buffer 101 is written with the NBA, SBP, and EBP values for the current buffer 101. The number of bytes written to the buffer 101 is added to the working byte count register. If the end of the frame is received, then go to step 3; otherwise, repeat step 2.

Step 3: The frame is then enqueued onto the tail of an input-queue to await dispatch to the network processor.
 a. If there were previously no frames in the input-queue, then the Head FCBA and Tail FCBA in the input-queue's QCB 104 are written with the address of the new frame's FCB 103. The Head BCNT in the QCB 104 is written with the working byte count register to record the total length of the new frame. The QCNT in the QCB 104 is incremented by 1.
 b. If there were already one or more frames in the input-queue, then the NFA and BCNT fields of the FCB 103 for the prior frame on the tail of the input-queue are written. The NFA field is written with the address of the new frame's FCB 103. The BCNT field is written with the working byte count register to record the length of the new frame. The Tail FCBA of the input-queue's QCB 104 is then written with the address of the new frame's FCB 103. The QCNT in the QCB 104 is incremented by 1.

When the frame reaches the head of the input-queue, it is then de-queued for dispatch to the network processor. The Head FCBA and Head BCNT fields are read from the input-queue's QCB 104. The Head FCBA value is then used to read the contents of the FCB 103 at the head of the queue. The NFA and BCNT values read from the FCB 103 are used to update Head FCBA and Head BCNT fields of the QCB 104. The FBA, SBP, and EBP values read from the FCB 103 are used to locate and read the frame data for dispatch to the network processor. The BCB 102 chain is followed until the frame data required for dispatch is read. The QCNT in the QCB 104 is decremented by 1.

Description of Invention

Figure 2:
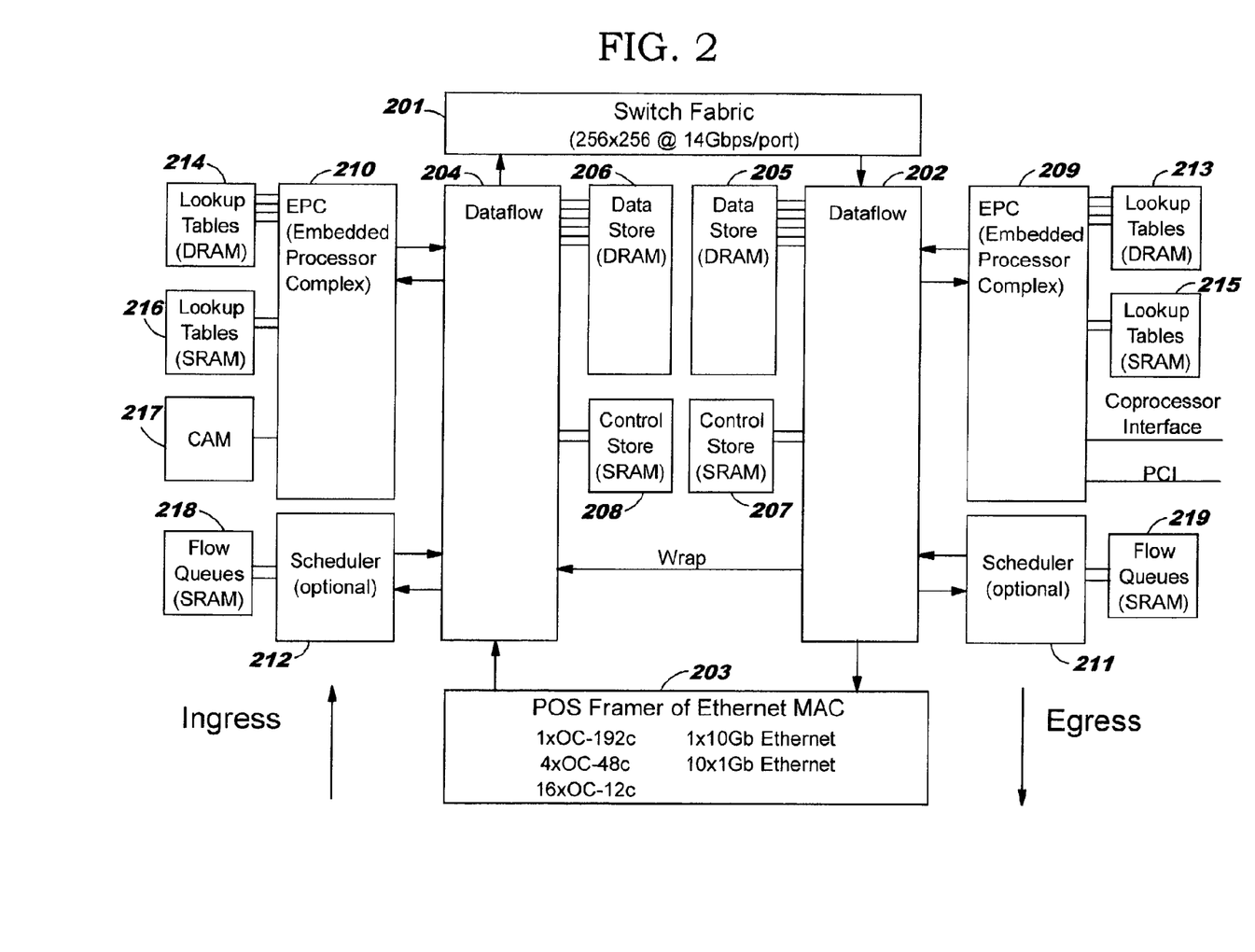
FIG. 2 is a block diagram showing the chip set system environment of the invention.

FIG. 2 depicts the chip set system environment upon which this invention is implemented. Frame data flows from the Switch Fabric 201 to Dataflow chip 202 and then to POS (Packet-Over-SONET) Framer or Ethernet MAC (Media Access Control) 203. From the POS Framer or Ethernet MAC 203, data flows to the Dataflow chip 204 and then to the switch fabric 201. Dataflow chips 202 and 204 are supported by data stores (dynamic random access memory (DRAM)) 205 and 206, respectively, and control stores (static random access memory (SRAM)) 207 and 208, respectively. Dataflow chips 202 and 204 communicate with respective embedded processor complexes (EPCs) 209 and 210, respectively, and optionally with scheduler chips 211 and 212, respectively. The EPCs 209 and 210 are supported by lookup tables 213 and 214, respectively, implemented in DRAM, and lookup tables 215 and 216, respectively, implemented in SRAM. EPC 209 additionally is provided with a coprocessor interface and a Peripheral Component Interconnect (PCI) local bus, while EPC 210 is additionally supported by content addressable memory (CAM) 217. If scheduler chips 211 and 212 are used, they are supported by flow queues 218 and 219, respectively, implemented in SRAM.

Note that all information flowing between the Dataflow 202 (204), EPC (embedded processor complex) 209 (210) and Scheduler 211 (212) is exchanged in a format called "messages". Information flowing between the Switch Fabric 201, Dataflow 202, and POS framer/Ethernet MAC 203 is in the format of "frames". Messages are used only for the exchange of "control" information between the Dataflow, EPC and Scheduler chips. Examples of such messages include: dispatch, enqueue, interrupt/exception, data read, data write, register read and register write. A message may consist of a request or response.

Figure 3:
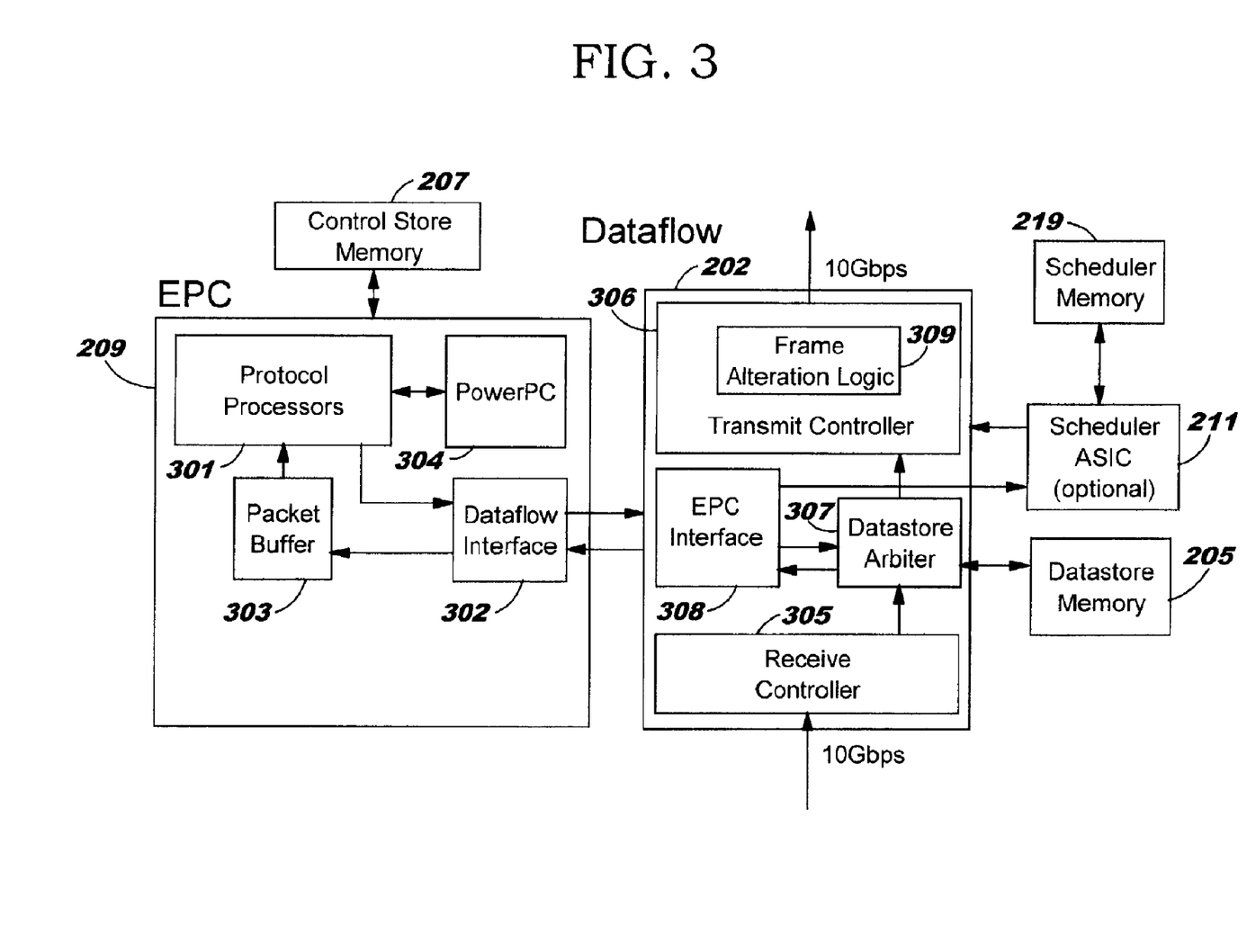
FIG. 3 is a block diagram showing in more detail the embedded processor complex and the dataflow chips used in the chip set of FIG. 2.

FIG. 3 shows in more detail the Dataflow chip 202 (204), EPC chip 209 (210) and Scheduler chip 211 (212). The EPC chip 209 (210) executes the software responsible for forwarding network traffic. It includes hardware assist functions for performing common operations like table searches, policing, and counting. The Dataflow chip 202 (204) serves as the primary data path for transmitting and receiving traffic via network port and/or switch fabric interfaces. It provides an interface to a large Datastore Memory 205 (206) for buffering of traffic as it flows through the network processor subsystem. It dispatches frame headers to the EPC for processing, and responds to requests from the EPC to forward frames to their target destination. An optional Scheduler chip 211 (212) may be added to enhance the Quality of Service (QoS) provided by the network processor subsystem. It permits up thousands of network traffic "flows" to be individually scheduled per their assigned QoS level.

The EPC chip 209 (210) includes twelve Dyadic Protocol Processor Units (DPPUs) 301 which provide for parallel processing of network traffic. Each DPPU contains two "picocode" engines. Each picocode engine supports two threads. Zero overhead context switching is supported between threads. A picocode instruction store is integrated within the EPC chip. Incoming frames are received from the Dataflow chip 202 (204) via the Dataflow interface 302 and temporarily stored in a packet buffer 303. A dispatch function distributes incoming frames to the Protocol Processors 301. Twelve input queue categories permit frames to be targeted to specific threads or distributed across all threads. A completion unit function ensures frame order is maintained at the output of the Protocol Processors 301.

An embedded PowerPC® microprocessor core 304 allows execution of higher level system management software. An 18-bit interface to external DDR SDRAM provides for up to 64 Mbytes of instruction store. A 32-bit PCI interface is provided for attachment to other control functions or for configuring peripheral circuitry such as MAC or framer components.

A hardware based classification function parses frames as they are dispatched to the Protocol Processors to identify well known Layer-2 and Layer-3 frame formats. The output of classifier is used to precondition the state of a picocode thread before it begins processing of each frame.

A table search engine provides hardware assist for performing table searches. Tables are maintained as Patricia trees with the termination of a search resulting in the address of a "leaf" entry which picocode uses to store information relevant to a flow. Three table search algorithms are supported: Fixed Match (FM), Longest Prefix Match (LPM), and a unique Software Managed Tree (SMT) algorithm for complex rules based searches. Control Store Memory 206 (207) provides large DRAM tables and fast SRAM tables to support wire speed classification of millions of flows. The SRAM interface may be optionally used for attachment of a Content Addressable Memory (CAM) (217 in FIG. 2) for increased lookup performance.

Picocode may directly edit a frame by reading and writing Datastore Memory 205 (206) attached to the Dataflow chip 202 (204). For higher performance, picocode may also generate frame alteration commands to instruct the Dataflow chip to perform modifications as a frame is transmitted via the output port.

A Counter Manager function assists picocode in maintaining statistical counters. On-chip SRAMs and an optional external SRAM (shared with the Policy Manager) may be used for counting events that occur at frame inter-arrival rates. One of the external Control Store DDR SDRAMs (shared with the table search function) may be used to maintain large numbers of counters for events that occur at a slower rate.

A Policy Manager function assists picocode in policing incoming traffic flows. It maintains thousands of leaky bucket meters with selectable parameters and algorithms. 1K Policing Control Blocks (PolCBs) may be maintained in an on-chip SRAM. An optional external QDR SRAM (shared with the Counter Manager) may be added to increase the number of PolCBs.

The Dataflow chip 202 (204) implements transmit and receive interfaces that may be independently configured to operate in "port" or "switch" interface mode. In port mode, the Dataflow chip exchanges frames for attachment of various network media such as Ethernet MACs or PacketOver-Sonet (POS) framers. It does this by means of a receive controller 305 and a transmit controller 306. In switch mode, the Dataflow chip exchanges frames in the form of 64-byte cell segments for attachment to cell based switch fabrics. Frames may be addressed to up to 64 target network processor subsystems via the switch interface, and up to 64 target ports via the port interface. The interface supports direct attachment of industry POS framers, and may be adapted to industry Ethernet MACs and switch fabric interfaces (such as CSIX) via Field Programmable Gate Array (FPGA) logic.

A large data memory 205 (206) attached to the Dataflow chip 202 (204) via a database arbiter 307 provides a "network buffer" for absorbing traffic bursts when the incoming frame rate exceeds the outgoing frame rate. It also serves as a repository for reassembling IP Fragments, and as a repository for frames awaiting possible retransmission in applications like TCP termination. Multiple DRAM interfaces are supported to provide sustained transmit and receive bandwidth for the port switch interfaces. Additional bandwidth is reserved for direct read/write of Datastore Memory by EPC picocode. The Datastore Memory 205 (206) is managed via linked lists of buffers. Two external SRAMs are used for maintaining linked lists of buffers and frames.

The Dataflow chip 202 (204) implements advanced congestion control algorithms such as "random early discard" (RED) to prevent overflow of the Datastore Memory 205 (206). The congestion control algorithms operate from input provided by the EPC picocode, EPC policing function, both communicated via the EPC interface 308 and various queue thresholds maintained by the Dataflow and Scheduler chips. A "discard probability memory" within the Dataflow is maintained by EPC picocode and referenced by the congestion control function to allow implementation of various standard or proprietary discard algorithms.

Figure 5:
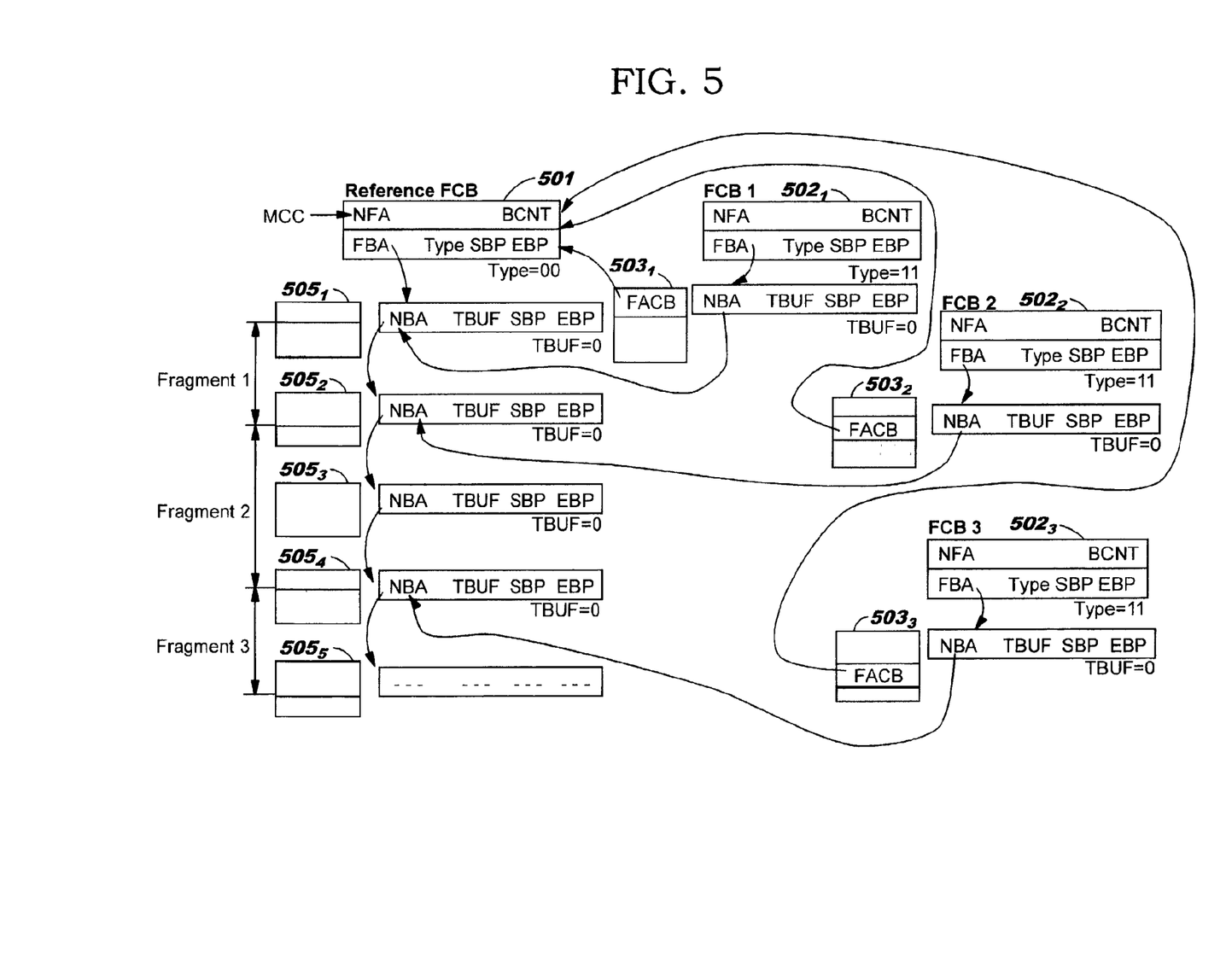
FIG. 5 is a block diagram illustrating the data structures according the invention.

The Dataflow chip 202 (204) implements a rich set of hardware assist functions for performing frame alterations in frame alteration logic 309 based on commands stored in the Frame Alteration Control Block (FACB) (shown in FIG. 5). Well known alterations include modifications of the following frame fields: Ethernet DA/SA, VLAN, DIX, SAP, SNAP, MPLS, IP TTL, IP TOS byte, and IP header checksum. The FACB serves two purposes: It stores the Reference FCB address for use in the multicast algorithm, and it stores frame alteration commands that instruct the frame alteration logic 309 (part of the Dataflow's transmit controller 306) to perform modifications to the frame data as it is transmitted via an output port. Examples of well known frame modifications performed by the frame alteration logic 309 are as follows: Ethernet destination or source address overlay, Ethernet protocol type overlay, MultiProtocol Label Switching (MPLS) label insert and deletes, Internet Protocol (IP) Time-to-Live (TTL) decrements, etc. Note that the frame alteration logic is not required to implement this invention. The same multicast technique could be used even if the Dataflow chip 202 (204) does not contain the frame alteration logic function.

The Dataflow chip 202 (204) implements a technique known as "virtual output queuing" where separate output queues are maintained for frames destined to different output ports or target destinations. This scheme prevents "head of line blocking" from occurring if a single output port becomes blocked. High and low priority queues are maintained for each output port to permit reserved and non-reserved bandwidth traffic to be queued independently.

The optional Scheduler chip 211 (212) provides for "quality of service" by maintaining flow queues that may be scheduled using various algorithms such as "guaranteed bandwidth", "best effort", "peak bandwidth", etc. Two external SRAMs are used to maintain thousands of flow queues with hundreds of thousands of frames actively queued. The Scheduler chip 211 (212) supplements the Dataflow chip's congestion control algorithms by permitting frames to be discarded based on per flow queue thresholds.

Note that all information flowing between the Dataflow 202 (204), EPC 209 (210) and Scheduler 211 (212) is exchanged in a format called "messages". Information flowing between the Switch Fabric 201, Dataflow 202, and POS Framer/Ethernet MAC 203 is in the form of "frames". Messages are used only for the exchange of "control" information between the Dataflow, EPC and Scheduler chips. Examples of such messages include: dispatch, enqueue, interrupt/exception, data read, data write, register read and register write. A message may consist of a request or response.

Figure 4:
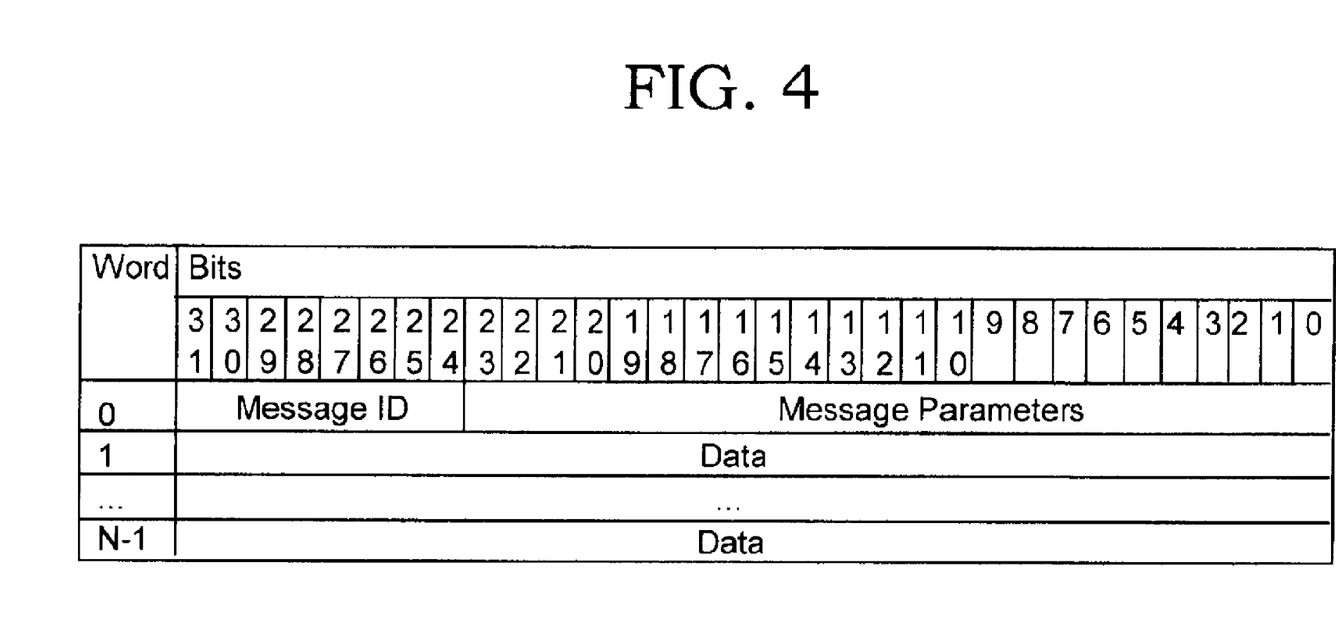
FIG. 4 is a diagram showing the general message format.

The general message format is depicted in FIG. 4. With reference to FIG. 3, the message format contains the following components:

Message-ID: The Message_ID field is an 8-bit encoded value in the first word of the message that uniquely identifies the message type.

Message-Parameters: The Message_Parameters field is a 24-bit value in the first word of a message that may be specified on a per message-type basis for various purposes as follows:

May be used as an extension to the Message_ID field to define other message types.

May be used on a per message-type basis to further qualify the purpose of the message.

May be used to carry "sequence numbers" or other "reference id" information that correlates the data returned in a response.

May be used to specify the message length in the case of variable length messages.

May be used to carry any other data parameter specific to the message.

Data: The remainder of the message may consist of from "0" to "N−1" additional 32-bit "Data" words.

IP Fragmentation

IP fragmentation may be handled as a special case of multicast transmission. FIG. 5 illustrates an example of IP fragmentation where a single frame is received and fragmented into three pieces that are then transmitted as separate frames. For multicast transmissions, each instance (i.e., the data addressed to a particular target) may have a different header, but the body of the frame is identical in each case. IP fragmentation can be handled in a manner analogous to multicast transmission where both the header and the body of each instance is different. By linking the header buffer of each instance into a different point in the frame, and specifying the appropriate BCNT value for each instance, the multicast transmission method described in co-pending U.S. patent application Ser. No. 09/839,079 (RAL9-2000-0120) supports IP Fragmentation.

The FCB that was assigned when the frame was originally received is retained throughout the life of the frame and is called the "Reference FCB" 501. The network processor obtains additional FCBs (named FCB 1, FCB 2, and FCB 3 in FIG. 5) $502_1$, $502_2$ and $502_3$ and buffers $503_1$, $503_2$ and $503_3$, and links them into the original Reference Frame 501 to create each instance of the multicast fragment transmission. Each instance is then queued for transmission.

The FCBs 502 and buffers 503 unique to each instance are discarded as each instance is transmitted. But the Reference FCB 501 and associated buffers $505_1$ to $505_5$ are discarded only after all instances have been transmitted. Because each instance of the frame may be transmitted via a different port, they may complete transmission in a different order than they were enqueued. A Multicast Counter (MCC) is used to determine when all the instances have been transmitted so that the reference frame can be discarded. The MCC is stored in the unused NFA field of the Reference FCB 501, as indicated in the upper left of FIG. 5. It is initialized with the number of instances in the multicast, and then decremented as each multicast instance is transmitted. When the MCC reaches zero, the Reference FCB 501 and its associated buffers $505_1$ to $505_5$ are discarded by returning them to the free FCB and free buffer queues respectively.

Reference FCB 501 and the other FCBs $502_1$, $502_2$ and $502_3$ all come from the same free pool of FCBs. When the FCB is being used as the Reference FCB, the NFA/MCC field is used as an MCC. When the FCB is being used as a regular (non Reference FCB), the NFA/MCC field is used as an NFA. The relationship between QCBs and FCBs is illustrated in FIG. 1. FCBs $502_1$, $502_2$ and $502_3$ are all placed into a queue for transmission. The Dataflow includes a QCB for every output queue. Each output queue is typically associated with a port (i.e., network communications link via the POS framer/Ethernet MAC, or another Network Processor via the Switch Fabric). Each of the three multicast instances illustrated in FIG. 5 are queued into an output queue. The NFA field in these FCBs is used to form the linked list of frames in the queue. The Reference FCB 501, however, is not included in any queue. It stores parameters that are used to return the buffers of the original (reference) frame to the free queue of buffers after all instances of the frame have been transmitted. Since the Reference FCB 501 is not included in a queue of frames, the NFA field is not required to form a linked list. Instead these bits of the NFA are used for storage of the MCC. The address of the Reference FCB is stored in the FACB (illustrated in FIG. 5) in front of the frame data where is used to locate the Reference FCB as each frame instance is transmitted.

The EPC chip 202 performs the following actions to enqueue each instance of the multicast frame:

1. An FCB 502 is obtained from the free FCB queue and is assigned to the instance.
2. One or more buffers 503 are obtained from the free buffer queue to contain the FACB and any unique header data for the instance. Use of the FACB is mandatory for multicast transmissions.
3. Any unique data for the instance is written to the buffers 503 obtained above. It is normal for each fragment of the frame to be transmitted with different header data (i.e., different sequence numbers, fragments lengths, etc.).
4. The BCBs 504 associated with the unique instance buffers are written to create a linked list that attaches them to the buffers of the original "reference frame". The unique instance buffers are linked to buffer in the reference frame that contains the first byte of the fragment to be transmitted. The SBP and EBP values are written in each BCB 504 to reflect the valid bytes in the next buffer. This permits the BCB 504 for the last unique buffer for the instance to specify a starting byte offset in the first linked buffer from the reference frame that is the first byte of the fragment to be transmitted. The TBUF bit is set to indicate if the next buffer should be returned to the free buffer queue immediately after its data is transmitted. The last unique buffer for the instance shall have the TBUF bit in its BCB 504 set to zero. The TBUF bit in the BCB 504 of all other unique buffers for the instance shall have their TBUF bit set to one.
5. The network processor then issues an enqueue operation to release the instance to the Dataflow 202 for transmission. The following information is provided to the Dataflow 202 as part of the enqueue operation:

Target Queue Number—Specifies which output queue the multicast instance is to be enqueued into.

FCBA—Specifies the Frame Control Block Address (FCBA) assigned to the multicast instance by the network processor.

BCNT—Specifies the total length of the fragment. It may be different for each multicast instance.

FBA—Specifies the address of the first buffer 101 in the multicast instance. The first buffer 101 is always unique to the multicast instance.

SBP/EBP—Specifies the starting and ending byte position of valid data in the first buffer 101.

Type—Specifies the type and format of the fragment to be transmitted. Always set to binary value "11" for "Multicast" frames. This value implies 1) that the frame is a multicast instance, 2) the first buffer 101 contains an FACB, and 3) the first buffer 101 is a transient buffer (TBUF=1).

FACB—Frame Alteration Control Block (FACB) information that specifies the alterations for the Dataflow 202 to apply to the fragment data as it is transmitted. The FACB may include different frame alteration requests for each multicast instance. However, each instance shall include the address of the Reference FCB 501 for use in discarded the reference frame after all instances have been transmitted.

Multicast Action—When enqueuing a multicast instance, the network processor specifies whether the current enqueue is the first, middle, or last instance of the multicast transmission.
 01—Multicast First—The first instance enqueued is identified as "multicast first".
 10—Multicast Middle—If the frame fragmentation consists of more than two instances, then any intermediate instances are identified as "multicast middle".
 11—Multicast Last—The last instance enqueued is identified as "multicast last".

The following describes the Dataflow chip's actions from reception of the enqueue operation through transmission of the multicast fragment instance via the target output port:

1. The Dataflow chip 202 writes the FACB information to the frame's first buffer $502_1$ using the FBA and SBP values provided in the enqueue as the buffer address and offset where the information is to be written.
2. The Dataflow chip 202 extracts the address of the Reference FCB 501 from within the FACB information. This address is used to access the Reference FCB 501 for storage of an MCC value. The MCC value is stored in the NFA field of the Reference FCB 501 (the NFA field of the Reference FCB 501 is unused since the Reference Frame is not directly in any queue). The value of the MCC 506 is updated as follows on enqueue:
 If Multicast Action is 01—Multicast First, then the MCC 506 is set to 2.
 If Multicast Action is 10—Multicast Middle, then the MCC 506 is incremented by 1.
 If Multicast Action is 11—Multicast Last, then the MCC 506 is not modified.
3. The Dataflow chip 202 writes the FBA, SBP, EBP and Type values to the FCB 502 specified by the FCBA value provided in the enqueue.
4. The Dataflow chip 202 enqueues the frame into the requested output queue specified by the Target Queue Number value provided in the enqueue. It does this as follows:
 a. If there were previously no frames in the output queue, then the Head FCBA and Tail FCBA in the output queue's QCB 104 (FIG. 1) are written with the FCBA value provided in the enqueue. The Head BCNT in the QCB 104 is written with the BCNT value provided in the enqueue. The QCNT in the QCB 104 is incremented by 1.
 b. If there were already one or more frames in the output queue, then the NFA and BCNT fields of the FCB 502 for the frame previously on the tail of the output queue are written. The NFA and BCNT fields are written with the FCBA and BCNT values provided in the enqueue. The Tail FCBA field of the output queue's QCB 104 (FIG. 1) is then written with the FCBA value provided in the enqueue. The QCNT in the QCB 104 is incremented by 1.
5. When the fragment reaches the head of the output queue, it is then dequeued for transmission via the output port. The Head FCBA and Head BCNT fields are read from the output queue's QCB 104. The Head BCNT value is loaded into a working byte count register for use during transmission of the fragment. The Head FCBA value is used to read the contents of the FCB 502 at the head of the queue. The NFA and BCNT values read from the FCB 502 are used to update Head FCBA and Head BCNT fields of the QCB 104 (FIG. 1). The FBA, SBP, EBP, and Type fields read from the FCB 502 are loaded into working registers for use during transmission of the data from the first buffer $504_1$. The FCB 502 is then discarded as its address is pushed onto the tail of the free FCB queue. The QCNT in the QCB 104 is decremented by 1.
6. The FBA, SBP, EBP, and Type values read from the FCB 103 are used to locate and read the contents of the first buffer 101 of the frame. The Type field indicates multicast, which implies that an FACB is present. Therefore the FACB is then read and transferred to the Frame Alteration logic where it is used to apply the requested modifications to the frame data as it is transmitted. The address of the Reference FCB 501 also extracted from the FACB and stored in a working register for use after the frame transmission is complete. The frame data from the buffer 101 (if any is present) is then placed into an output FIFO (first in, first out buffer) to be transmitted via the output port. The number of bytes placed into the output FIFO is the lesser of the working byte count register and the number of valid bytes in the buffer 101 as indicated by the SBP and EBP values. The working byte count register is then decremented by the number of bytes of data placed into the output FIFO. If the value in the working byte count register is still greater than zero, then the NBA, SBP, EBP, and TBUF values are read from the BCB 102 corresponding to the first buffer 101 and are loaded into working registers for use in transmission of the next buffer 101. The first buffer 101 is then discarded as its buffer address is pushed onto the tail of the free buffer queue.
7. The NBA, SBP, EBP, and TBUF values read from the BCB 102 are used to locate and read the contents of the next buffer 101 of the frame. The frame data from the buffer 101 is then placed into the output FIFO to be transmitted via the output port. The number of bytes placed into the output FIFO is the lesser of the working byte count register and the number of valid bytes in the buffer 101 as indicated by the SBP and EBP values. The working byte count register is then decremented by the number of bytes of data placed into the output FIFO. If the value in the working byte count register is still greater than zero, then the NBA, SBP, EBP, and TBUF values are read from the BCB 102 for the current buffer 101 and are loaded into working registers for use in transmission of the next buffer 101. If the TBUF bit for the current buffer 101 was set, then it is discarded by pushing its buffer address onto the tail of the free buffer queue. Step 7 is then repeated until the working byte count register has been decremented to zero.
8. After completion of the frame transmission, the Reference FCB address previously stored in a working register is used to read the MCC field in reference FCB 501 stored in the NFA field of the Reference FCB 501. One of the following two actions is then performed:

- If the MCC value is greater than one, then it is decremented by one and written back to the NFA field of the Reference FCB 501. Transmission of this multicast instance is then complete. However the reference fragment may not be discarded because the other multicast instances have not completed transmission.
- If the MCC value is equal to one, then the Reference FCB 501 is enqueued into a "discard queue" to return the FCB and buffers associated with the reference frame to the free queue. Transmission of all instances of the multicast frame are then complete.

Figure 6:
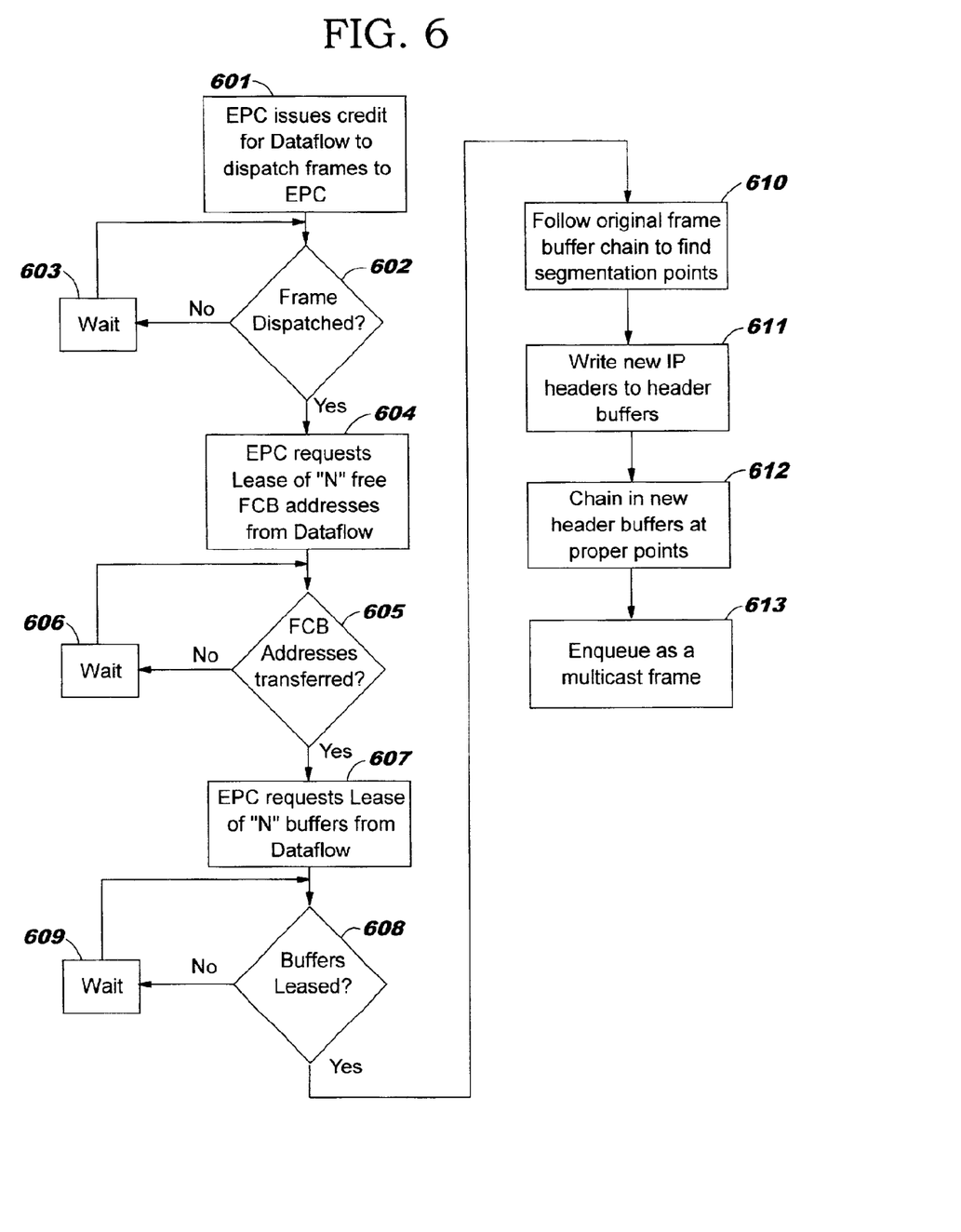
FIG. 6 is a flow diagram showing the IP fragmentation process.

FIG. 6 depicts a flowchart showing how IP fragmentation is accomplished with the invention. The process begins in function block 601 by the EPC 209 issuing credits for the Dataflow chip 202 to dispatch frames to the EPC 209. A determination is made in decision block 602 as to whether a frame has been dispatched. If not, the process waits in function block 603. When a frame has been dispatched, the EPC 209 requests the lease of "N" free FCB addresses from the Dataflow chip 202 in function block 604. A determination is made in decision block 605 as to whether the requested FCB addresses have been transferred. If not, the process waits in function block 606. When the FCB addresses have been transferred, the EPC 209 requests the lease of "N" buffers from the Dataflow chip 202 in function block 607. A determination is then made in decision block 608 as to whether the buffers have been leased. If not, the process waits in function block 609. When the buffers have been leased, the process follows the original frame buffer chain to find segmentation points in function block 610. After the segmentation points have been found, the process writes new IP headers to header buffers in function block 611. In function block 612 the process then chains in new header buffers at the proper points. Finally, the process then enqueues the result as a multicast frame in function block 613.

IP Reassembly

IP reassembly is the reverse of IP fragmentation. Multiple frame fragments are received and must be reassembled into a single frame for transmission. The data structures described previously support this process:

1. The network processor stores the FCB value of each frame fragment as it arrives.
2. When all fragments of the frame have arrived, the network processor determines the proper order of each of the frame fragments.
3. The BCB linked lists of each of the frame fragments are then linked by the network processor into a single chain of buffers that make up the reassembled frame.
4. The network processor then enqueues the reassembled frame to the Dataflow for transmission. It specifies a BCNT value that reflects the total length of the reassembled frame. The FCB value received with the first frame fragment is used as the FCB value for the reassembled frame.
5. The network processor then returns the unused FCB values for the other fragments to the free FCB queue.

Figure 7:
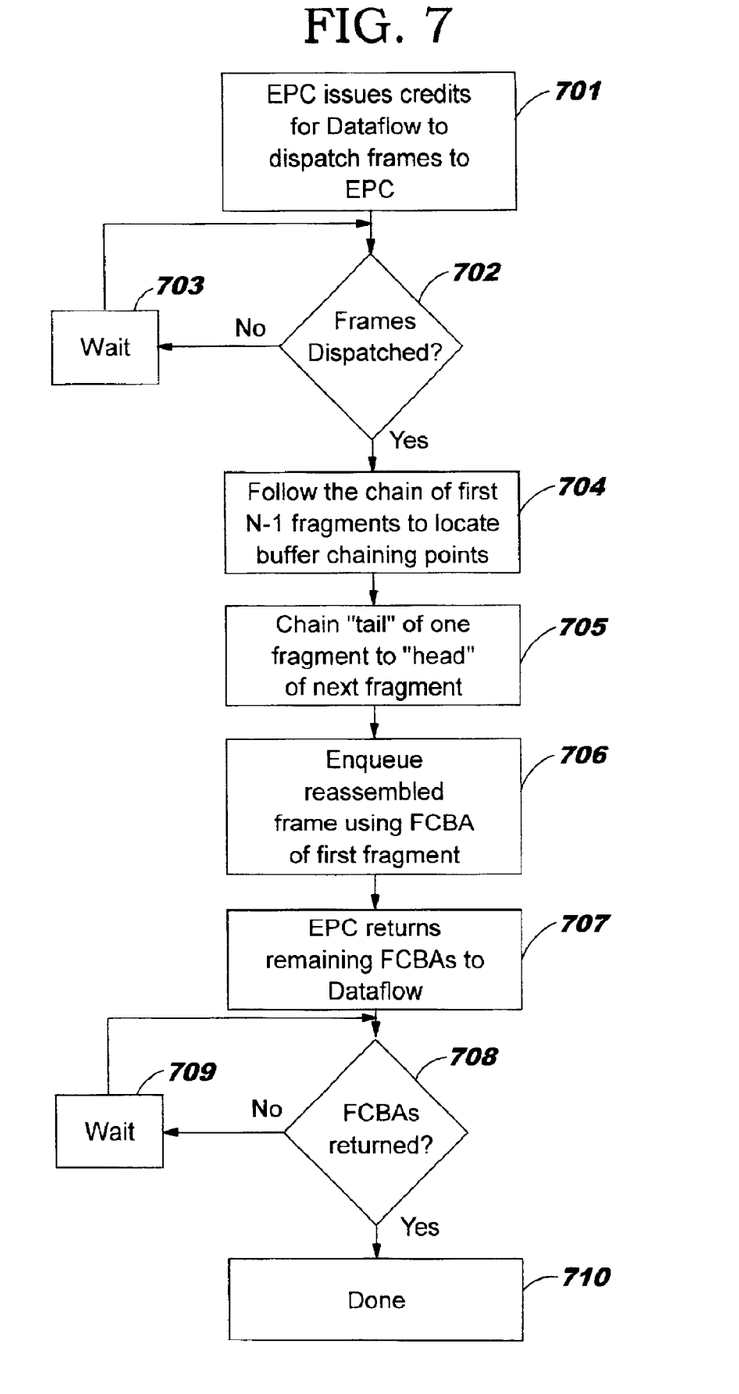
FIG. 7 is a flow diagram showing the IP reassembly process.

FIG. 7 depicts a flowchart showing how IP reassembly is accomplished with the invention. The process begins in function block 701 by the EPC 210 issuing credits for the Dataflow chip 204 to dispatch frames to the EPC 210. A determination is made in decision block 702 as to whether a frame has been dispatched. If not, the process waits in function block 703. When a frame has been dispatched, the process then follows the chain of the first N−1 fragments to locate the buffer chaining points in function block 704. In function block 705 the process then chains the tail of one fragment to the head of the next fragment. In function block 706 the reassembled frame is then enqueued using the FCBA of the first fragment. The FCBAs of the other fragments are then returned to the EPC 209 in function block 707. In decision block 708 a determination is made as to whether the FCBAs have all been returned. If not, the process waits in function block 709. When the FCBAs have all been returned, the process ends in function block 710.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of IP fragmentation on a network processor comprising the steps of:
    storing a frame to be fragmented in a series of buffers, chained together by a linked list;
    associating a buffer control block with each buffer;
    associating a frame control block with each frame;
    receiving frames into a queue to await dispatch to a network processor;
    associating a queue control block with a queue of frames to be transmitted;
    assigning additional buffers and additional frame control blocks for each multicast target and linking these additional frame control blocks with the original frame control block associated with the frame;
    using a multicast counter to determine when all frame fragments have been transmitted;
    returning buffers and frame control blocks assigned to each fragment to a free queue as each fragment is transmitted; and
    returning the original buffers and frame control block to the free queues after the frame has been sent to all of the multicast targets.

2. The method for IP fragmentation as recited in claim 1, wherein the buffer control block associated with each buffer forms a linked list for chaining buffers into a frame and contains a plurality of fields, including separate fields to
    store a pointer to a next buffer in the frame;
    store an offset of a first valid byte of data in the next buffer of a frame;
    store an offset of a last valid byte of data in the next buffer of a frame; and
    indicate whether the next buffer in the frame should be returned to the free buffer or queue or retained so as to continue multicast transmission.

3. The method for IP fragmentation as recited in claim 1, wherein the frame control block associated with each frame forms a linked list for chaining frames into a queue and contains a plurality of fields, including separate fields to
    store a pointer to a next frame in the queue;
    store a count of a total number of bytes of the next frame in the queue;
    store an address of a first buffer in a frame;
    store a starting byte position of valid data in the first buffer of a frame;
    store an ending byte position of valid data in the first buffer of a frame; and
    store information on a format and a type of a frame to be transmitted.

4. The method for IP fragmentation as recited in claim 1, wherein the step of receiving frames into a queue comprises the further steps of:
  popping a free buffer address from a head of the free buffer queue;
  popping a free frame control block from the head of the free frame control block queue;
  writing frame data to a buffer;
  writing control information, including a first buffer address, starting and ending byte positions for valid data in the first buffer, to the frame control block;
  setting a working byte count register to a number of bytes written to the first buffer;
  repeating this process until an entire frame is written to buffers; and
  adding a frame to a tail of an input queue to await dispatch to the network processor.

5. The method for IP fragmentation as recited in claim 1, wherein the queue control block associated with the queue of frames to be transmitted includes a plurality of fields, including separate fields to
  store an address of the frame control block associated with the frame at a head of the queue;
  store a count of a total number of valid bytes in the frame at a top of the queue; and
  store the address of the frame control block associated with the frame at a tail of the queue.

6. A method for IP reassembly on a network processor comprising the steps of:
  storing frames to be reassembled in a series of buffers chained together by a linked list;
  associating a buffer control block with each buffer;
  associating a frame control block with each frame;
  receiving frames into a queue to await dispatch to a network processor;
  associating two or more received frames that are to be reassembled into a single transmit frame;
  updating the buffer control blocks to modify the linked list of buffers for combining multiple frames into a single reassembled frame;
  associating a frame control block with the reassembled frame;
  returning unused frame control blocks to a free queue;
  associating a queue control block with a queue of frames to be transmitted; and
  returning the buffers and frame control block of the reassembled frame to a free queue as the frame is transmitted.

7. A network processor for processing IP fragmentation comprising:
  means for storing a frame to be fragmented in a series of buffers, chained together by a linked list;
  means for associating a buffer control block with each buffer and associating a frame control block with each frame;
  means for receiving frames into a queue to await dispatch to a network processor;
  means for associating a queue control block with a queue of frames to be transmitted;
  means for assigning additional buffers and additional frame control blocks for each multicast target and linking these additional frame control blocks with the original frame control block associated with the frame;
  means using a multicast counter for determining when all frame fragments have been transmitted; and
  means for returning buffers and frame control blocks assigned to each fragment to a free queue as each fragment is transmitted and returning the original buffers and frame control block to free queues after the frame has been sent to all of the multicast targets.

8. The network processor as recited in claim 7, wherein the buffer control block associated with each buffer forms a linked list for chaining buffers into a frame and contains a plurality of fields, including separate fields to
  store a pointer to a next buffer in the frame;
  store an offset of a first valid byte of data in the next buffer of a frame;
  store an offset of a last valid byte of data in the next buffer of a frame; and
  indicate whether the next buffer in the frame should be returned to the free buffer or queue or retained so as to continue multicast transmission.

9. The network processor as recited in claim 7, wherein the frame control block associated with each frame forms a linked list for chaining frames into a queue and contains a plurality of fields, including separate fields to
  store a pointer to a next frame in the queue;
  store a count of a total number of bytes of the next frame in the queue;
  store an address of a first buffer in a frame;
  store a starting byte position of valid data in the first buffer of a frame;
  store an ending byte position of valid data in the first buffer of a frame; and
  store information on a format and a type of a frame to be transmitted.

10. The network processor as recited in claim 7, wherein the means for receiving frames into a queue comprises:
  means for popping a free buffer address from a head of the free buffer queue;
  means for popping a free frame control block from a head of the free frame control block queue;
  means for writing frame data to a buffer and writing control information, including a first buffer address, starting and ending byte positions for valid data in the first buffer, to the frame control block;
  means for setting a working byte count register to a number of bytes written to the first buffer; and
  means, responsive to an entire frame being written to buffers, for adding a frame to a tail of an input queue to await dispatch to the network processor.

11. The network processor as recited in claim 7, wherein the queue control block associated with the queue of frames to be transmitted includes a plurality of fields, including separate fields to
  store an address of the frame control block associated with the frame at a head of the queue;
  store a count of a total number of valid bytes in the frame at a top of the queue; and
  store the address of the frame control block associated with the frame at a tail of the queue.

12. A network processor for IP reassembly comprising:
  means for storing frames to be reassembled in a series of buffers chained together by a linked list;
  means for associating a buffer control block with each buffer and associating a frame control block with each frame;

means for receiving frames into a queue to await dispatch to a network processor;

means for associating two or more received frames that are to be reassembled into a single transmit frame;

means for updating the buffer control blocks to modify the linked list of buffers for combining multiple frames into a single reassembled frame and associating a frame control block with the reassembled frame; and means for returning unused frame control blocks to a free queue, associating a queue control block with a queue of frames to be transmitted, and returning the buffers and frame control block of the reassembled frame to a free queue as the frame is transmitted.

* * * * *